(12) United States Patent
Bergin

(10) Patent No.: US 10,745,012 B2
(45) Date of Patent: Aug. 18, 2020

(54) APPARATUS AND METHOD FOR CONTROLLING MOTOR VEHICLE MOVEMENT

(71) Applicant: Ford Global Technologies, LLC, Dearborn, MI (US)

(72) Inventor: Graham Bergin, Offaly (IE)

(*) Notice: Subject to any disclaimer, the term of this patent is extended or adjusted under 35 U.S.C. 154(b) by 0 days.

(21) Appl. No.: 15/266,681

(22) Filed: Sep. 15, 2016

(65) Prior Publication Data
US 2017/0072959 A1    Mar. 16, 2017

(30) Foreign Application Priority Data
Sep. 16, 2015   (GB) .................................. 1516406.4

(51) Int. Cl.
| | | |
|---|---|---|
| *B60W 30/18* | (2012.01) | |
| *B60W 30/14* | (2006.01) | |
| *B60W 10/02* | (2006.01) | |
| *B60W 10/06* | (2006.01) | |
| *B60W 10/18* | (2012.01) | |

(52) U.S. Cl.
CPC ...... *B60W 30/18027* (2013.01); *B60W 10/02* (2013.01); *B60W 10/06* (2013.01); *B60W 10/18* (2013.01); *B60W 30/143* (2013.01); *B60W 30/18118* (2013.01); *B60W 30/18172* (2013.01); *B60W 2520/10* (2013.01); *B60W 2520/26* (2013.01); *B60W 2540/04* (2013.01); *B60W 2550/141* (2013.01); *B60W 2710/02* (2013.01); *B60W 2710/06* (2013.01); *B60W 2710/18* (2013.01); *B60W 2720/10* (2013.01); *B60W 2720/26* (2013.01); *B60W 2720/30* (2013.01)

(58) Field of Classification Search
CPC .............................................. B60W 30/18027
See application file for complete search history.

(56) References Cited

U.S. PATENT DOCUMENTS

| | | | |
|---|---|---|---|
| 9,026,326 B2 | 5/2015 | Nozu et al. | |
| 2009/0063000 A1 | 3/2009 | Kodama et al. | |
| 2015/0203119 A1 | 7/2015 | Bird et al. | |
| 2015/0232092 A1* | 8/2015 | Fairgrieve ........... B60W 30/143 |
| | | | 701/93 |

FOREIGN PATENT DOCUMENTS

| | | |
|---|---|---|
| DE | 10238870 A1 | 3/2004 |
| DE | 10356194 A1 | 7/2005 |
| DE | 102012016772 A1 | 2/2014 |
| EP | 2433843 A1 | 3/2012 |
| GB | 2523177 A | 8/2015 |
| JP | 201014090 | 1/2010 |
| WO | WO2015041593 A1 | 3/2015 |

OTHER PUBLICATIONS

Communication pursuant to Article 94(3) from European Patent Application No. 16275114.3, dated Apr. 30, 2020, pp. 7.

* cited by examiner

*Primary Examiner* — Imran K Mustafa
(74) *Attorney, Agent, or Firm* — Raymond L. Coppiellie; Burgess Law Office, PLLC

(57) ABSTRACT

A method for controlling a motor vehicle take-off from rest including the steps of transitioning the vehicle from a brake holding mode to an engine driving mode and then accelerating the vehicle in a forward direction until a set vehicle target speed has been reached. The method including maintaining the vehicle at the set target speed until a driver of the vehicle intervenes.

21 Claims, 4 Drawing Sheets

APPARATUS AND METHOD FOR CONTROLLING MOTOR VEHICLE MOVEMENT

CROSS-REFERENCE TO RELATED APPLICATIONS

Not Applicable.

BACKGROUND OF THE INVENTION

1. Field of the Invention

This invention relates to motor vehicles and in particular to a method of controlling a motor vehicle take-off from rest.

2. Description of Related Art

When a motor vehicle takes-off from rest with the intention of ascending a slope it is often difficult for a driver of the motor vehicle to perform the take-off without producing excessive wheel spin, unintentional roll-back or stalling the engine. This problem is exacerbated if the vehicle is towing a heavy trailer due to the additional weight of the trailer.

SUMMARY OF THE INVENTION

A method of controlling an automatic take-off of a motor vehicle including providing a brake system, the brake system including a brake holding mode wherein a brake of the brake system generates a brake holding force that prevents movement of a wheel of the motor vehicle, providing an engine, the engine including an engine driving mode wherein the engine generates a driving force that rotates a wheel of the motor vehicle, and providing a human machine interface. The method includes using the human machine interface to set a vehicle target speed. The method checks whether a driver of the vehicle requests an automatic take-off and whether at least one condition for the use of the automatic take-off is present.

When an automatic take-off is requested by a driver of the vehicle and the at least one condition for the use of the automatic take-off are both present, the method includes controlling the engine of the vehicle and the braking system of the vehicle to transition the vehicle from a brake holding mode to an engine driving mode, accelerating the vehicle until the vehicle target speed is reached and maintaining the speed of the vehicle at the vehicle target speed until there is an intervention by the driver.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
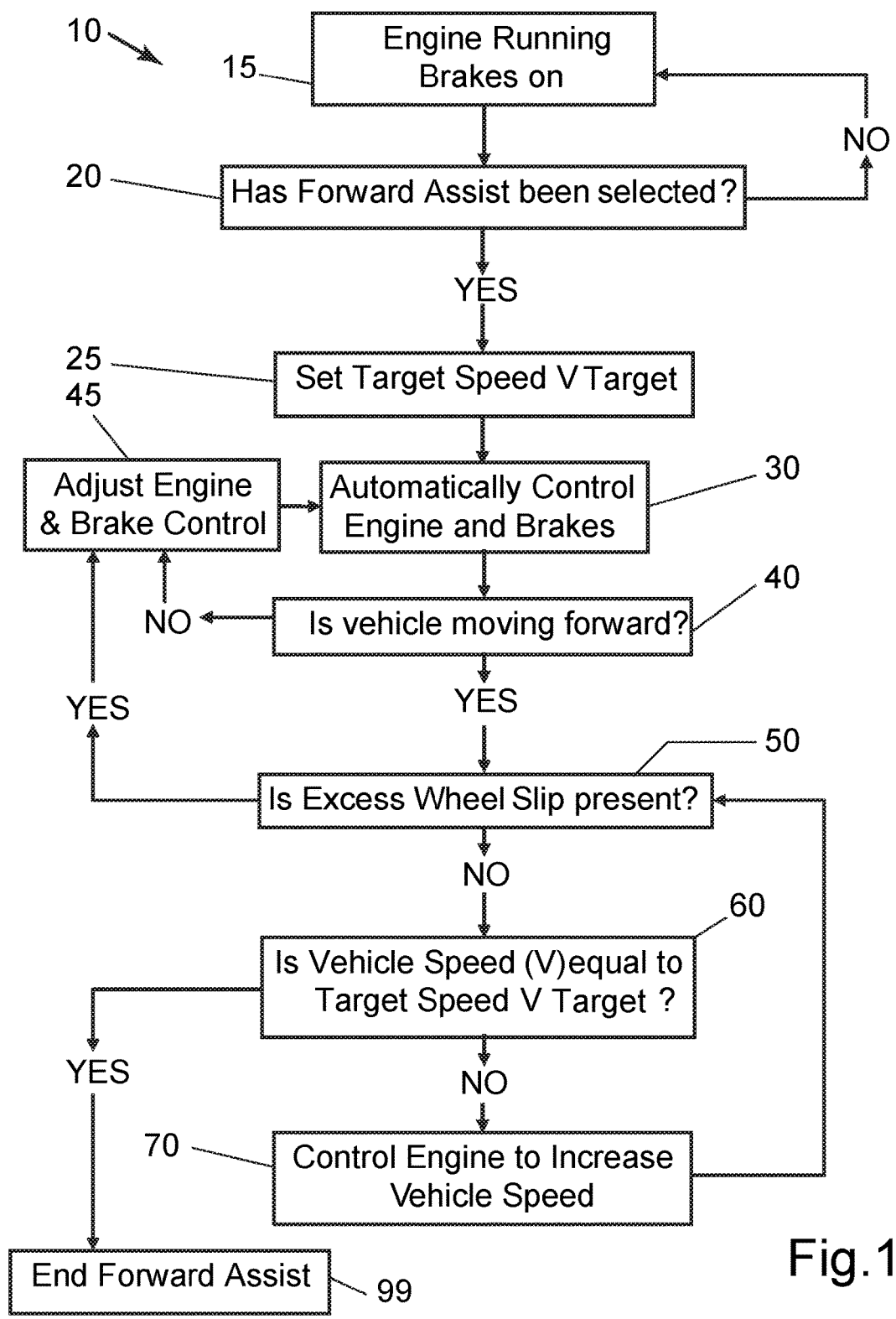
FIG. 1 is a flow chart of a method of controlling a vehicle take-off in accordance with a first aspect of the invention.

FIG. 1 shows a method 10 of controlling a vehicle take-off from rest. The method starts in box 15 with the engine running and the brakes applied, the brake(s) in this example include an electronically controlled parking brake. The brakes could be the main service brakes of the motor vehicle if these are electronically controllable as is normally the case in an automatic/autonomous braking system.

The method advances from box 15 to box 20 where it is checked whether the driver has requested assistance in starting the vehicle from rest, referred to as selecting 'forward assist' or selecting an automatic take-off. This request can be made in any suitable manner but typically a human machine interface such as a button, switch, or other input device is provided for use by the driver.

If the driver has not selected 'forward assist' then the method returns to box 15. The check in box 20 could also include additional checks referred to as 'feature entry condition' checks. Such feature entry condition checks can include whether the vehicle is stationary and whether a transmission of the vehicle has been placed in a forward drive ratio. Alternatively, there could be additional steps provided in the method to carry out these 'feature entry condition' checks.

If one or more of these additional checks fails then 'forward assist' is not possible and the method would return to box 15. In such a case, the driver could be warned that 'forward assist' is not currently available by illuminating a warning lamp or via a message provided via a display.

If the check or checks in box 20 are passed, the method advances to box 25 where a target vehicle speed (VTarget) is set. The target vehicle speed (VTarget) can be a predefined value stored in a memory device of an electronic controller or be a variable value that can be altered by the driver of the vehicle. For example, the target vehicle speed (VTarget) can be set by the use of a human machine interface device normally used to set a vehicle cruising speed if cruise control is fitted on the vehicle, be altered using the same human machine interface device used to select 'forward assist' or be adjusted using a human machine interface device. Irrespective of the manner in which the target vehicle speed (VTarget) is set, from box 25 the method advances to box 30.

In box 30, the engine of the motor vehicle and the brakes referred to in box 15 are automatically controlled to produce a vehicle take-off. This requires the force produced by the engine to drive the vehicle up the incline be increased as the force produced by the electronically controlled brakes holding the vehicle stationary is reduced. This is referred to as balancing engine force with holding force. In order to produce forward movement of the vehicle the force produced by the engine must be greater than the gravitational force applied to the vehicle due to its location facing up an incline.

In a case where the electronically controlled parking brake is able to provide a variable braking force then it is only necessary to reduce the holding force produced by the electronically controlled parking brake. In a case such as that shown where the parking braking is either in an on state or in an off state with very little transition then during vehicle take-off the service brakes are automatically applied when the parking brake is released and the holding force supplied by the service brakes is then ramped down.

From box 30 the method advances to box 40 where it is checked whether the vehicle is moving forward. There are several reasons why a vehicle will not be moving forward. For example, and without limitation, the force balance between the engine force and the holding force is such that the holding force is greater than the engine force, the gravitational force applied to the vehicle by its location on an incline is greater than the force being supplied by the engine and the force produced by the engine is equal to the gravitational force on the vehicle due to its location facing up an incline.

If it is determined that the vehicle is not moving forward the method advances to box 45 where adjustments are made to one or more of engine torque and holding torque (electronic parking brake or service brakes) and the method then returns to box 30. If the brakes are in a low holding force state then, generally, this adjustment is an increase in engine torque setpoint. If the brakes are in a high holding force state then, generally, this adjustment is a reduction in holding force. If the brakes are in an intermediate holding force state then, generally, the adjustment will comprise a reduction in holding force and an increase in engine torque setpoint.

In the case of the present example, when the vehicle is not moving forward the method moves directly to box 45, however it will be appreciated that as part of this process it could be checked to see whether wheel slip (spin) is occurring and if necessary implementing a slip control function as part of the adjustment made in box 45. Boxes 30, 40, and 45 are repetitively executed until the vehicle is moving forward.

If, when checked in box 40, the vehicle is moving forward, the method advances from box 40 to box 50 and it is checked whether excess wheel slip is present. A small amount of wheel slip may be allowed but a large amount of wheel slip reduces traction and increases tire wear. If excess wheel slip is present, the method advances to box 45 where in this case the engine torque setpoint is reduced to reduce the magnitude of the wheel slip. The method then returns to box 30.

The vehicle could be provided with a number of traction modes and that the value that constitutes excess wheel slip could be varied based upon the selected mode. For example, and without limitation, if the vehicle has a sand traction mode then a large amount of slip could be allowed compared to a dry road mode.

If when checked in box 50 there is no excess wheel slip the method advances from box 50 to box 60 to check whether the target vehicle speed VTarget has been reached.

If, when checked in box 60, the target vehicle speed VTarget has been reached, the method advances from box 60 to box 80 where the speed of the vehicle is maintained at the target vehicle speed VTarget until the driver intervenes at which point the method ends as indicated in box 99.

The driver can intervene by increasing the vehicle speed above the vehicle target speed by, for example, depressing an accelerator pedal; requesting a reduction in vehicle speed by, for example, depressing a brake pedal; or manually operating a 'forward assist' cancel device such as, for example, a button or switch.

If, when checked in box 60, the target vehicle speed VTarget has not been reached, the method advances from box 60 to box 70 where the engine torque setpoint is increased to increase the speed of the vehicle. The method then loops back to box 50 and will advance to either box 45 or box 60 depending upon the result of the check carried out in box 50.

Therefore, as disclosed in the foregoing example the method provides a balance between holding force and engine force that is initially adjusted in order to produce forward motion of the vehicle and then when forward motion is achieved, the torque output from the engine is gradually increased to increase the speed of the vehicle until a predefined low vehicle speed such as, for example and without limitation, 8 kph has been reached. Preferably, during the 'forward assist' process it is continuously checked to ensure that excess wheel slip is not occurring and, if excess wheel slip is occurring, the torque output from the engine is reduced to reduce the amount of wheel slip. This reduction in wheel slip can be facilitated by, for example, torque vectoring across the differential using the service brakes, the use of a traction control system present on the vehicle, the use of an electronic wheel slip control system present on the vehicle or the use of an electronic stability control system present on the vehicle.

In the case of a vehicle having an engine driving a transmission via a torque converter, the connection between the engine and the transmission is automatically adjusted as the engine speed and the resultant torque output from the engine increases and so direct control of this coupling is not required. Therefore, the term balancing engine force with holding force means in practice balancing the force applied to the vehicle due to the torque transmitted to the transmission via the torque convertor coupling and the holding force from the respective brake.

In the case of a vehicle having an electronically controlled friction clutch then not only must the engine and brake(s) be controlled but also the engagement state of the friction clutch. That is to say, balancing engine force with holding force means, in practice, balancing the force applied to the vehicle due to the torque transmitted to the transmission via the friction clutch and the holding force produced by the respective brake(s).

Figure 2:
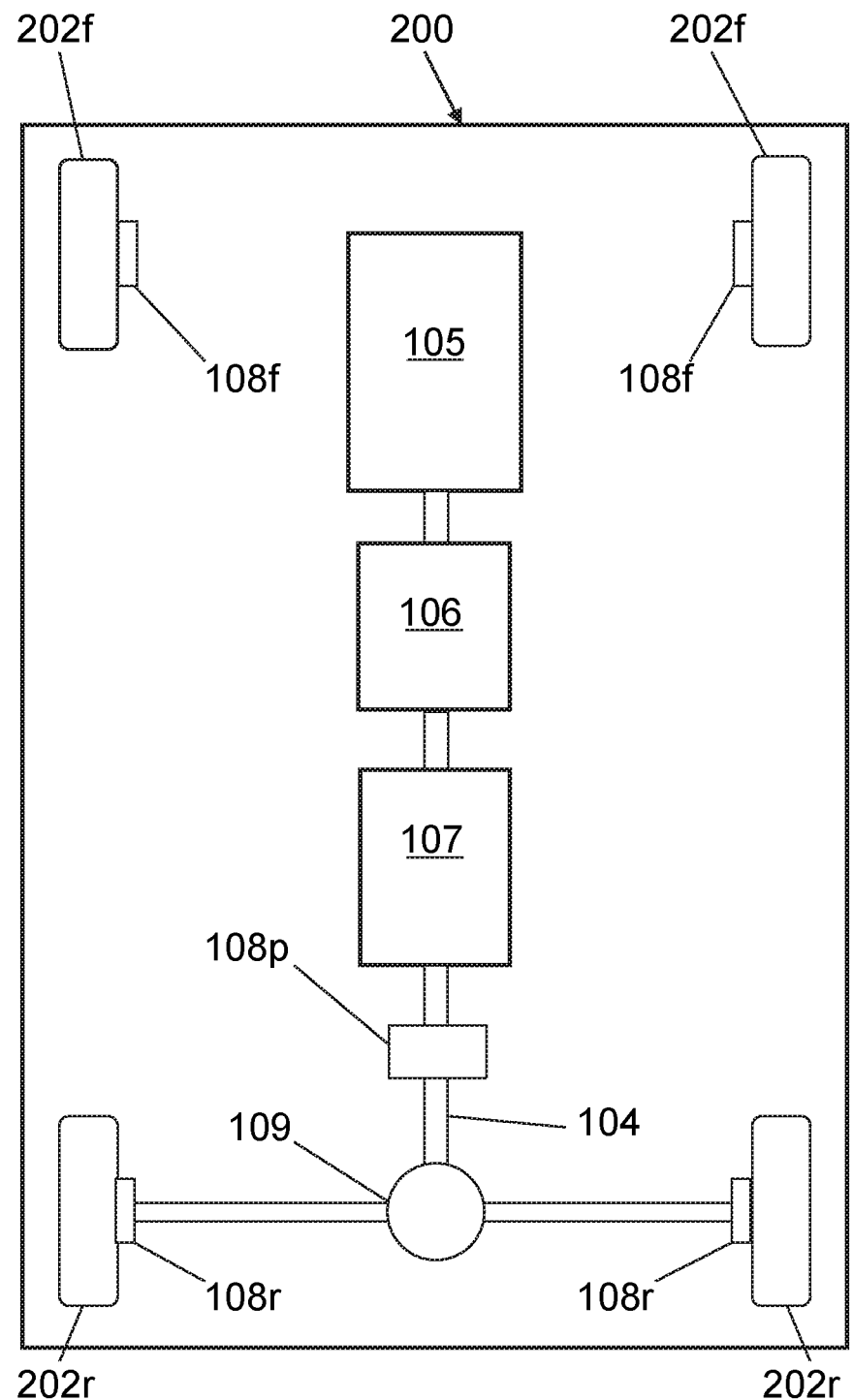
FIG. 2 is a schematic diagram of a motor vehicle in accordance with an aspect of the invention showing some key mechanical components.

Referring now to FIG. 2 there is shown a motor vehicle 200 that in the case of this example is a rear wheel drive vehicle but could be of any known driven wheel configuration. The vehicle 200 has four road wheels 202$f$, 202$r$, an engine 105 driving a multi-speed transmission 107 via a coupling 106 and a rear axle 109 provided with drive from the transmission 107 via a propeller shaft 104. The coupling 106 is in the case of this example a torque converter.

Both of the front road wheels 202$f$ have a respective service brake assembly 108$f$ arranged to provide a braking force to the respective wheel 202$f$. Both of the rear road wheels 202$r$ have a respective service brake assembly 108$r$ arranged to provide a braking force to the respective wheel 202$r$.

The rear wheels 202$r$ are driven by the engine 105 and transmission 107 via the rear axle 109 to provide a tractive force for the vehicle 200.

An electronically controlled parking brake 108$p$ is arranged to cooperate with the propeller shaft 104 so as to be able to selectively prevent rotation of the propeller shaft 104 and hence movement of the vehicle 200. The invention is not limited to the use of a propeller shaft mounted parking brake, the parking brake could, for example, brake one or more of the road wheels 202$f$, 202$r$.

Figure 3A:
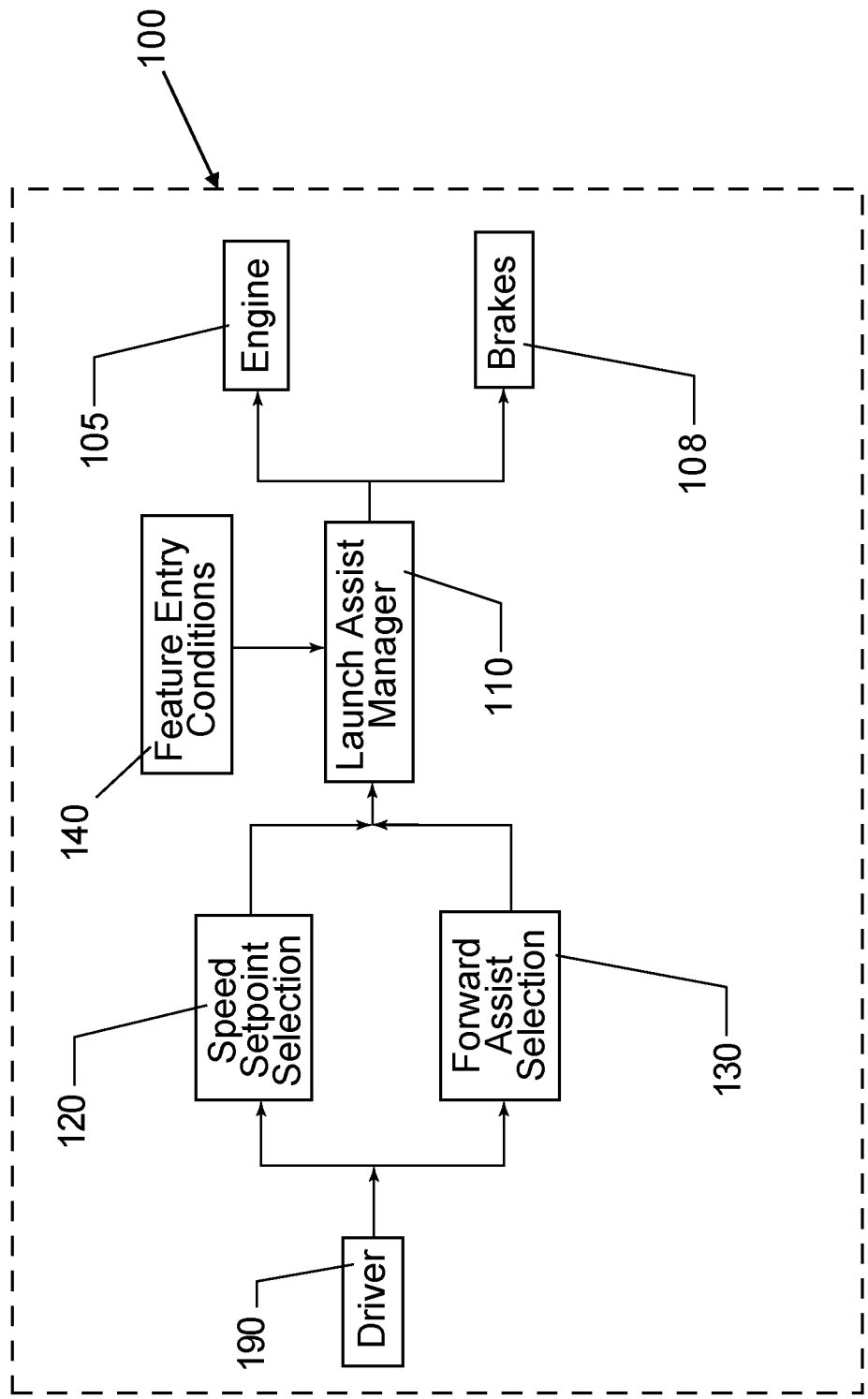
FIG. 3a is a schematic diagram of the motor vehicle shown in FIG. 2 showing the inputs and outputs from a launch assist module forming part of an apparatus for controlling a vehicle take-off in accordance with the invention.
Figure 3B:
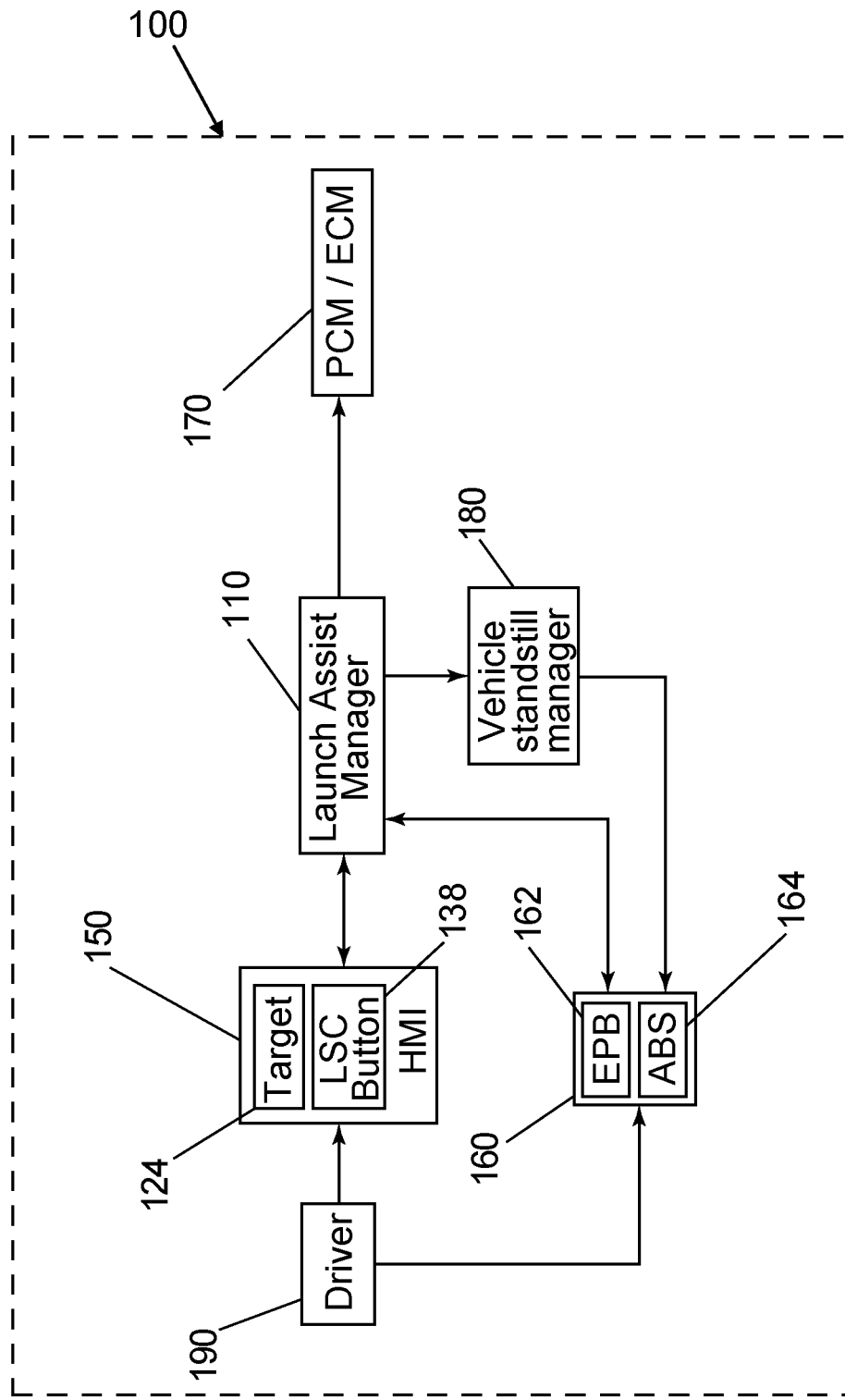
FIG. 3b is a schematic diagram similar to FIG. 3a but showing in more detail the apparatus for controlling the vehicle take-off.

With reference to FIGS. 3a and 3b, there is shown an apparatus 100 for controlling the take-off from rest of the vehicle 200 shown in FIG. 2. The apparatus 100 includes the engine 105, a braking system 108 including the service brakes 108f, 108r and the parking brake 108p, an electronic controller in the form of a launch assist manager module 110, a human machine interface (HMI) 150 including a vehicle target speed setting device 124 and a 'forward assist' selector button 138, a vehicle standstill controller 180, a braking system module 160 including an electronic parking brake controller 162 and an antilock braking controller 164 and a central controller 170 including at least one of an engine control module (ECM) and powertrain control module (PCM). Also shown are various apparatus inputs including a vehicle target speed input 120, a feature entry condition input 140, a 'forward assist' selection input 130 and an input 190 indicative of driver inputs to the apparatus 100.

The vehicle target speed input 120 is produced by the action of the driver operating the vehicle target speed setting device 124 forming part of the HMI 150. The target speed setting device is operable to set a vehicle target speed within a predefined range of vehicle speeds to provide a driver adjustable vehicle target speed.

In the case of this example, the vehicle target speed setting device 124 is part of a cruise control system for which the device 124 is normally used to set a cruise control speed for the vehicle 200. The logic used by the cruise control system to control the speed of the vehicle 200 during normal use can be used to control the vehicle 200 to maintain a low forward speed at the end of a take-off from rest to maintain the vehicle target speed. The 'forward assist' selection input 130 is produced by the actuation of a low speed control button 138 forming part of the HMI 150.

The braking system module 160 also includes, in addition to the anti-lock functionality previously referred to, torque vectoring control functionality and brake assisted hill descent control functionality. The braking system controller 160 is arranged to control the application and release of the electronically controlled parking brake 108p via the electronic parking brake controller 162 and in this case is operable to control the automatic application and release of the service brakes 108f, 108r if so enabled. If the electronically controlled parking brake 108p provides a variable braking force rather than the on or off functionality, then it is possible for the braking system controller 160 to control only the electronically controlled parking brake during a take-off. However, in the case of this example, the braking system controller 160 has to apply the service brakes 108f, 108r momentarily to hold the vehicle 200 as the electronically controlled parking brake 108p is transitioned from 'on' to 'off'. The braking system controller 160 then releases the service brakes 108f, 108r as the engine torque is increased for the take-off.

The braking system module 160 is in the case of this example further arranged to prevent locking of any of the road wheels via the antilock braking controller 164. The antilock braking controller forms part of an antilock braking system that includes wheel speed sensors to monitor the rotational speed of all of the road wheels 202f, 202r.

The central controller 170 is arranged to control the operation of the engine 105 and in the case of an electronically controlled transmission select a desired gear ratio in the transmission.

In a case where the coupling 106 is in the form of an electronically controlled friction clutch, the central controller 170 is also arranged to control the engagement and disengagement of the friction clutch.

The vehicle standstill manager 180 is arranged to provide a signal to the braking system module 160 that braking is required to hold the vehicle stationary and monitors via the use of one or more sensors (not shown) the motion of the vehicle 200 to detect whether the vehicle 200 is moving forward or backward. During normal operation if there is any forward or backward motion when the driver has indicated that they wish the vehicle to remain stationary, by, for example, applying the electronically controlled parking brake 108p then the standstill controller 180 indicates to the brake system control module 160 that an increased braking force is required. During a take-off from rest during a 'forward assist' take-off the standstill controller 180 assists the launch assist manager module 110 to prevent rollback of the vehicle 200.

The vehicle 200 may further include functionality to prevent or reduce wheel slip. This functionality can be formed as part of a traction control system, an electronic wheel slip control system or an electronic stability control system. In the case of this example, a wheel slip control system is formed as part of the central controller 170. The electronic wheel spin control system reduces the output torque from the engine 105 when the magnitude of wheel slip exceeds a predefined limit. The wheel rotation sensors of the anti-lock braking system are used to measure the rotation speed of the road wheels 202f, 202r from which it can be deduced whether wheel slip is occurring and the magnitude of that slip.

If an electronic stability control system is used, then the application of the respective service brake 108r of the wheel 202r that is slipping is used to prevent excess wheel slip (torque vectoring). As previously mentioned, the magnitude of permitted slip may in some embodiments be varied based upon the surface conditions of the terrain upon which the vehicle 200 is resting.

The function of the launch assist manager module 110 is to manage the various systems and sub-systems required to cause the vehicle 200 to move off from a stationary position in a controlled manner and to accelerate the vehicle 200 to a predefined low road speed. 110

Operation of the apparatus 100 is as follows. When a driver input 190 is provided by the action of the driver pressing the low speed control button 138, the launch assist manager module 110 identifies this as a request from the driver to conduct an automatic take-off (a request for 'forward assist').

The driver can also input a desired vehicle target speed that is to be attained when the take-off is complete by using the vehicle target speed setting device 124 to adjust the target speed to that required. In some embodiments, a visual output of the chosen target speed is provided to the driver by means of a display device that acts as a feedback to the driver of their action.

In an alternative embodiment, the vehicle target speed is a predefined speed and the driver does not need to set the vehicle target speed in this case. In either case, the launch assist manager module 110 is notified of the desired target speed.

The launch assist manager module 110 also receives an input 140 of the feature entry conditions, which are used to decide whether it is safe or possible to use 'forward assist' at this point in time. For example, the launch assist manager module 110 may receive information regarding whether there are any powertrain or braking system error messages, whether a driver is present in the vehicle 200, and whether the current speed of the vehicle 200 is substantially zero. If there are not any powertrain or braking system error messages, a driver is present in the vehicle 200 and the vehicle speed is substantially zero then the use of 'forward assist' is approved for use. If the use of 'forward assist' is not approved, the launch assist manager module 110 will provide an indication to the driver that this functionality is not currently available.

Assuming that 'forward assist' is approved for use, the launch assist manager module 110 enters an automatic take-off mode and checks whether the driver is depressing a brake pedal (not shown) of the vehicle 200. If the driver is depressing the brake pedal, then the take-off is delayed until the driver releases the brake pedal. The launch assist manager module 110 also checks to confirm that a suitable forward ratio has been selected in the transmission 107. If a suitable ratio has not been selected, then the launch assist manager module 110 either indicates to the driver that a forward ratio of the transmission 107 has to be selected or automatically selects via the central controller 170 a suitable forward drive ratio after carrying out safety checks to confirm that the selection of such a ratio will not cause an undesirable situation. These safety checks may include whether the rotational speed of the engine 105 is above a predefined level. If the rotational speed of the engine 105 is high, the engagement of a forward ratio may cause the vehicle 200 to jump forward or produce a large and unacceptable sudden input to the drivetrain.

When the conditions for 'forward assist' are present, the launch assist manager module 110 controls the engine 105 via the central controller 170, the electronic parking brake 108$p$ via the vehicle standstill manager 180, and the electronic parking brake controller 162 to release the electronically controlled parking brake 108$p$ and temporarily apply the service brakes 108$f$, 108$r$ via the braking system module 160 to prevent rollback of the vehicle 200. The launch assist manager module 110 is therefore arranged to transition the vehicle 200 from a brake holding mode in which movement is prevented by the braking system to an engine driving mode in which the engine 105 is used to hold the vehicle 200 stationary and subsequently drive it up the incline.

The launch assist manager module 110 then synchronously releases the service brakes 108$f$, 108$r$ while ramping up the torque produced by the engine 105 by increasing an engine torque setpoint in the central controller 170.

Initially, if the vehicle 200 is parked facing up an incline, the aim is to match the gravitational force acting on the vehicle 200 by the application of a combination of driving force produced by the engine and holding force produced by the electronically controlled service brakes 108$f$, 108$r$. However, as the service brakes 108$f$, 108$r$ are released the emphasis changes to produce a net force urging the vehicle 200 up the incline. By the time the service brakes 108$f$, 108$r$ are fully released, the vehicle 200 is moving up the incline and will continue to accelerate until it reaches the target vehicle speed. When the vehicle reaches the target speed, the speed of the vehicle 200 will be maintained at that level until the driver interrupts the control. The launch assist manager module 110 may utilize the logic and functionality of a cruise control system to maintain the vehicle 200 at the target speed or contain equivalent functionality.

If during the automatic take-off excessive wheel slip is encountered, then the electronic wheel slip control system automatically intervenes to reduce the wheel slip. In some cases, the vehicle 200 will be provided with a number of traction or terrain modes. If such functionality is provided, then the value that constitutes excessive wheel slip could be varied based upon the selected mode. For example, and without limitation, if the vehicle has a sand traction mode then a large amount of slip could be allowed compared to a dry road mode.

The rate at which the engine 105 is permitted to accelerate or decelerate is regulated by the central controller 170 for NVH, performance, and drivability reasons.

Forward assist is immediately cancelled if during the take-off the driver intervenes by accelerating the vehicle above the predefined target vehicle speed by, for example, depressing an accelerator pedal (not shown) of the vehicle 200, depressing the brake pedal beyond a predefined threshold indicating that the vehicle is to be stopped, or operating a human machine interface device to indicate that 'forward assist' is not required.

The launch assist manager module 110 is therefore arranged to manage the transition between stationary and parked to a low vehicle speed without the need for direct driver intervention and uses or shares the functionality of other systems on the vehicle 200 to achieve this in an economical and reliable manner.

The launch assist manager module could be formed as part of another control unit such as for example a powertrain control unit.

Although the invention has been described with reference to a particularly advantageous embodiment in which the vehicle is required to take-off up an incline it will be appreciated that it could be used in other conditions such as, for example, pulling away on a level road when the road is slippery due to mud, snow or ice.

It will be appreciated by those skilled in the art that although the invention has been described by way of example with reference to one or more embodiments it is not limited to the disclosed embodiments and that alternative embodiments could be constructed without departing from the scope of the invention as defined by the appended claims.

Further, the description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method of controlling an automatic take-off of a motor vehicle comprising:
providing a brake system, the brake system including a brake holding mode wherein a brake of the brake system generates a brake holding force that prevents movement of a wheel of the motor vehicle;
providing an engine, the engine including an engine driving mode wherein the engine generates a driving force that rotates a wheel of the motor vehicle;
providing a human machine interface;
using said human machine interface to set a vehicle target speed;
checking whether an automatic take-off is requested by a driver of the vehicle;
checking whether at least one condition for the use of the automatic take-off is present; and
when an automatic take-off is requested by a driver of the vehicle and the at least one condition for the use of the automatic take-off are both present, controlling the engine of the vehicle and the braking system of the vehicle to transition the vehicle from a brake holding mode to an engine driving mode, accelerating the vehicle until the vehicle target speed is reached and maintaining the speed of the vehicle at the vehicle target speed until there is an intervention by the driver.

2. The method of claim 1 wherein transitioning the vehicle from a brake holding mode to an engine driving mode includes increasing the driving force produced by the engine as the holding force produced by the braking system is reduced.

3. The method of claim 2 wherein the vehicle has a multi-speed transmission coupled to the engine by a torque converter and increasing the driving force produced by the engine includes increasing the rotational speed of the engine to increase the torque transmitted by the torque converter to the multi-speed transmission.

4. The method of claim 2 wherein the vehicle has a multi-speed transmission coupled to the engine by an electronically controlled friction clutch and increasing the driving force produced by the engine comprises engaging the clutch to increase the torque transmitted by the friction clutch to the multi-speed transmission.

5. The method of claim 3 wherein increasing the driving force produced by the engine further comprises increasing the torque output from the engine.

6. The method of claim 1 including the step of detecting presence of wheel slip during vehicle take-off and reducing engine driving force to reduce wheel slip.

7. The method of claim 1 including the step of detecting presence of wheel slip during vehicle take-off and applying a holding force to reduce wheel slip.

8. The method of claim 1 wherein one of the conditions for the use of the automatic take-off includes the braking system of the vehicle holding the vehicle stationary by the use of one or more electronically releasable brakes.

9. The method of claim 1 wherein a driver of the vehicle uses the human machine interface to cancel the automatic take-off.

10. The method of claim 1 wherein the automatic take-off is cancelled when a driver of the vehicle intervenes by depressing a control pedal.

11. An apparatus for controlling motor vehicle movement comprising:
a plurality of wheels;
an engine connected to and providing power to at least one of said wheels:
a braking system including at least one electronically controllable braking device for selectively preventing movement of the vehicle;
a human machine interface for selecting an automatic take-off from rest and a vehicle target speed;
a control unit, said control unit receiving input from said human machine interface and a status of vehicle system condition, said control unit determining based on said input whether at least one condition for the use of the automatic take-off are present; and
said control unit controlling the engine output and the braking system to transition the vehicle from a brake holding mode to an engine driving mode, controlling the acceleration of the vehicle until the vehicle target speed is reached, and maintaining engine control to maintain the vehicle at the vehicle target speed until there is an intervention by the driver.

12. The apparatus of claim 11 wherein the control unit includes a launch assist manager to increase engine output as the brake system holding force is reduced.

13. The apparatus of claim 12 wherein the vehicle has a multi-speed transmission coupled to the engine by a torque converter and increasing the engine output includes increasing the rotational speed of the engine to increase the torque transmitted by the torque converter to the multi-speed transmission.

14. The apparatus of claim 12 wherein the vehicle has a multi-speed transmission coupled to the engine by an electronically controlled friction clutch and increasing the engine output includes engaging the friction clutch to increase the torque transmitted by the friction clutch to the multi-speed transmission.

15. The apparatus of claim 11 wherein increasing the engine output includes increasing the torque output from the engine.

16. The apparatus of claim 11 wherein the launch assist manager controls engine output to reduce the torque output from the engine when wheel slip is detected during the take-off.

17. The apparatus of claim 11 wherein the braking system includes a braking system module operable to electronically control the application of service brakes used to brake the wheels and, when wheel slip is produced during the take-off from rest, the launch assist manager cooperates with the braking system module to apply a braking torque to one or more slipping wheels to reduce the slip.

18. The apparatus of claim 11 wherein one condition for the use of automatic take-off is the vehicle held stationary by one or more electronically releasable brakes.

19. The apparatus of claim 11 wherein the driver uses the human machine interface to cancel the automatic take-off when a driver indicates that they wish to stop the vehicle.

20. The apparatus of claim 11 wherein the automatic take-off is cancelled when a driver of the vehicle indicates that they wish the vehicle to exceed the vehicle target speed.

21. An apparatus for controlling motor vehicle movement comprising:
a plurality of wheels;
an engine;
a propeller shaft connected to the engine and the wheels:
a braking system including an electronically controlled parking brake, the parking brake engaging and preventing rotation of the propeller shaft and thereby preventing movement of the vehicle;
a human machine interface for selecting an automatic take-off from rest and a vehicle target speed;
a control unit, said control unit receiving input from said human machine interface and a status of vehicle system condition, said control unit determining based on said input whether at least one condition for the use of the automatic take-off are present; and
said control unit controlling the engine output and the braking system to transition the vehicle from a brake holding mode to an engine driving mode, controlling the acceleration of the vehicle until the vehicle target speed is reached, and maintaining engine control to maintain the vehicle at the vehicle target speed until there is an intervention by the driver.

* * * * *